Figure 1:
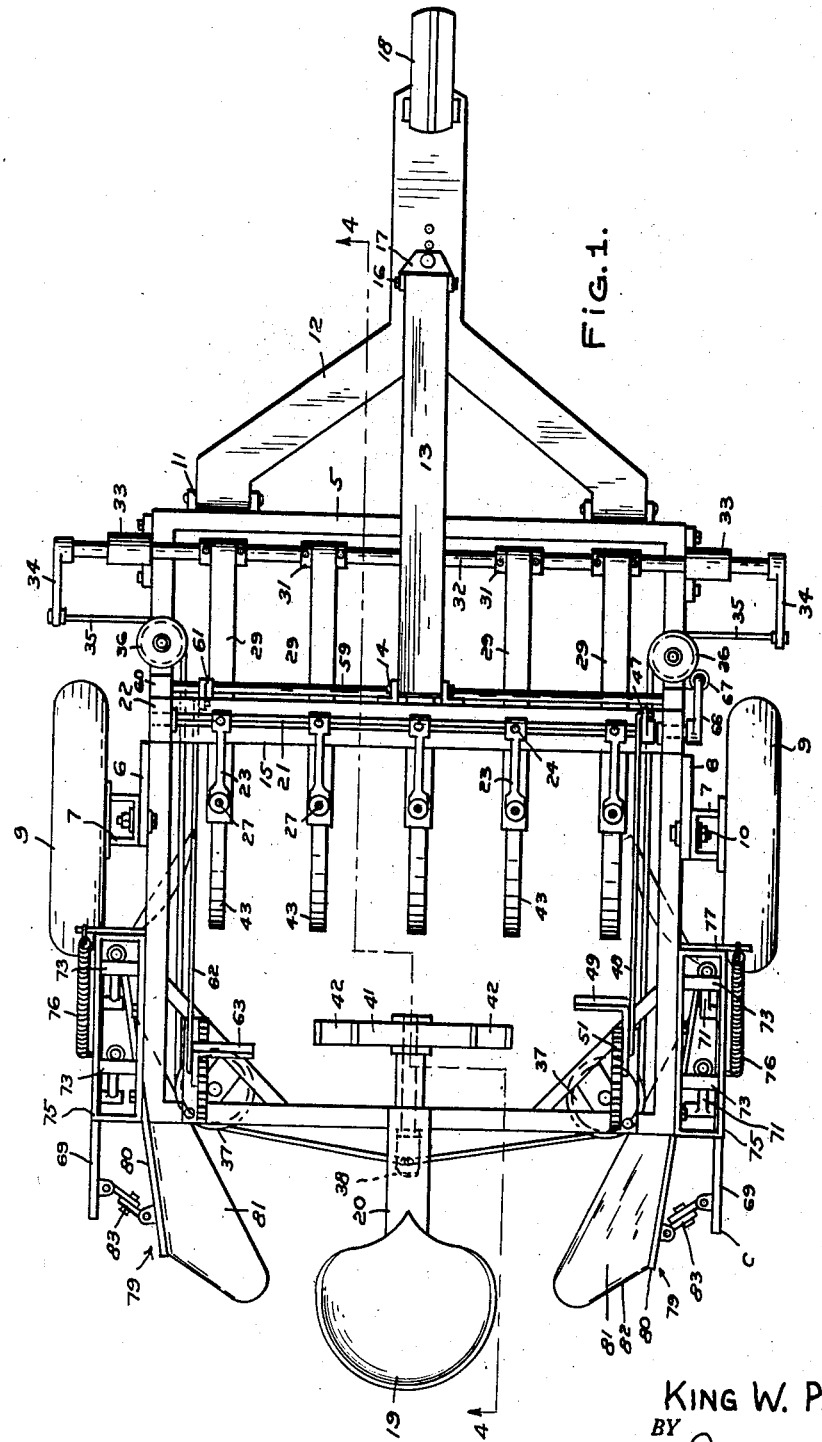

Sept. 30, 1958     K. W. PARKS     2,853,930
AGRICULTURAL MACHINE

Filed Sept. 21, 1954     3 Sheets-Sheet 1

INVENTOR.
KING W. PARKS
BY
ATTORNEY

Sept. 30, 1958
K. W. PARKS
2,853,930
AGRICULTURAL MACHINE
Filed Sept. 21, 1954
3 Sheets-Sheet 2
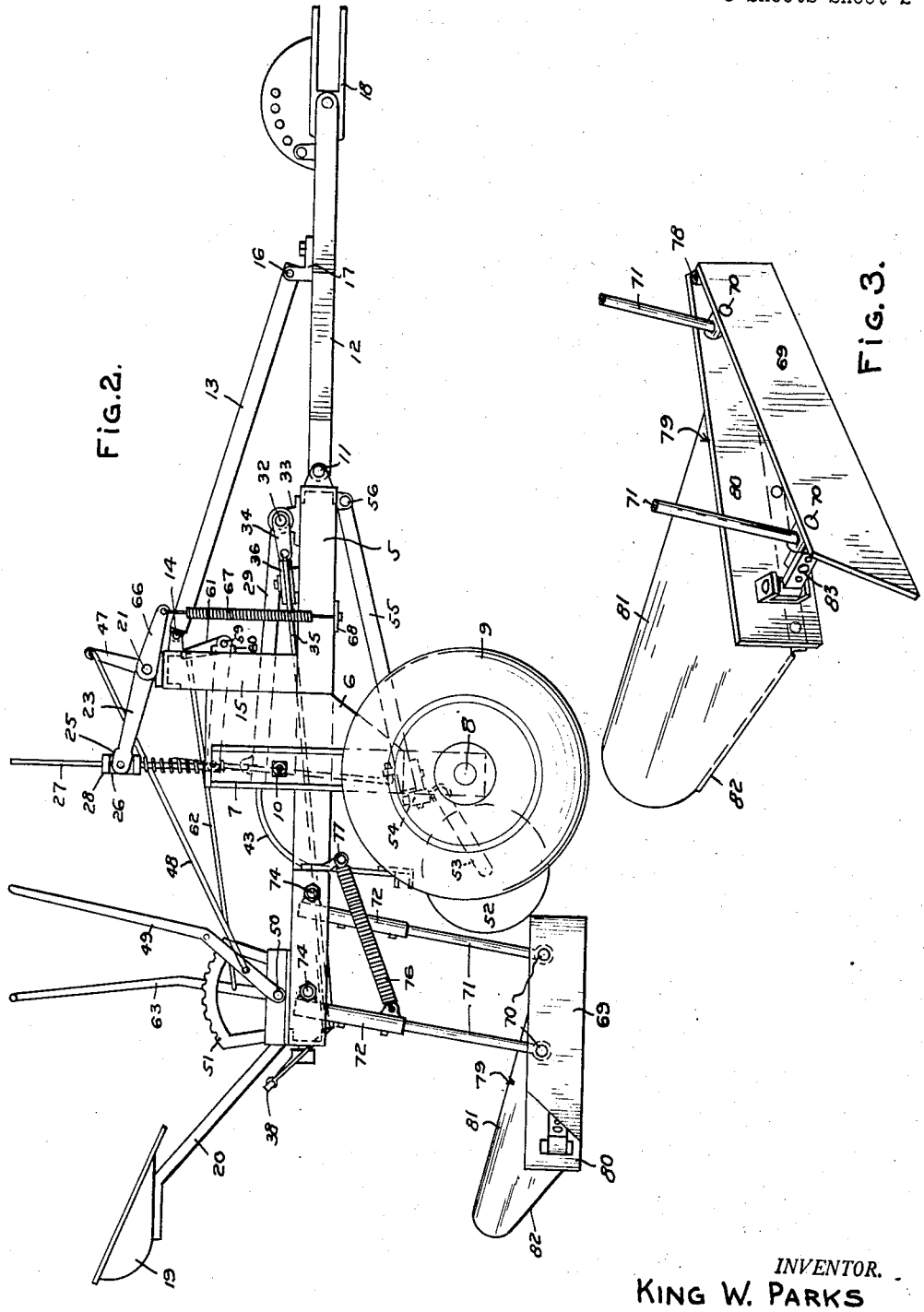
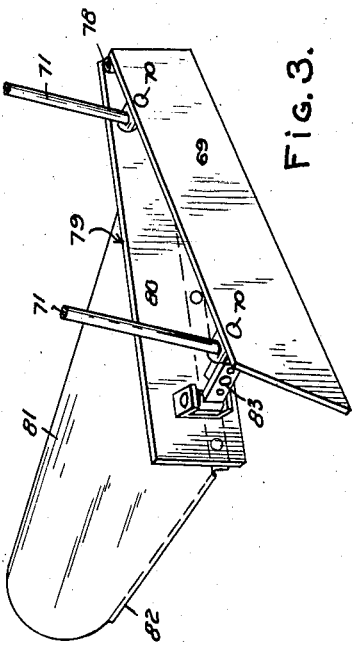
INVENTOR.
KING W. PARKS
BY
ATTORNEY

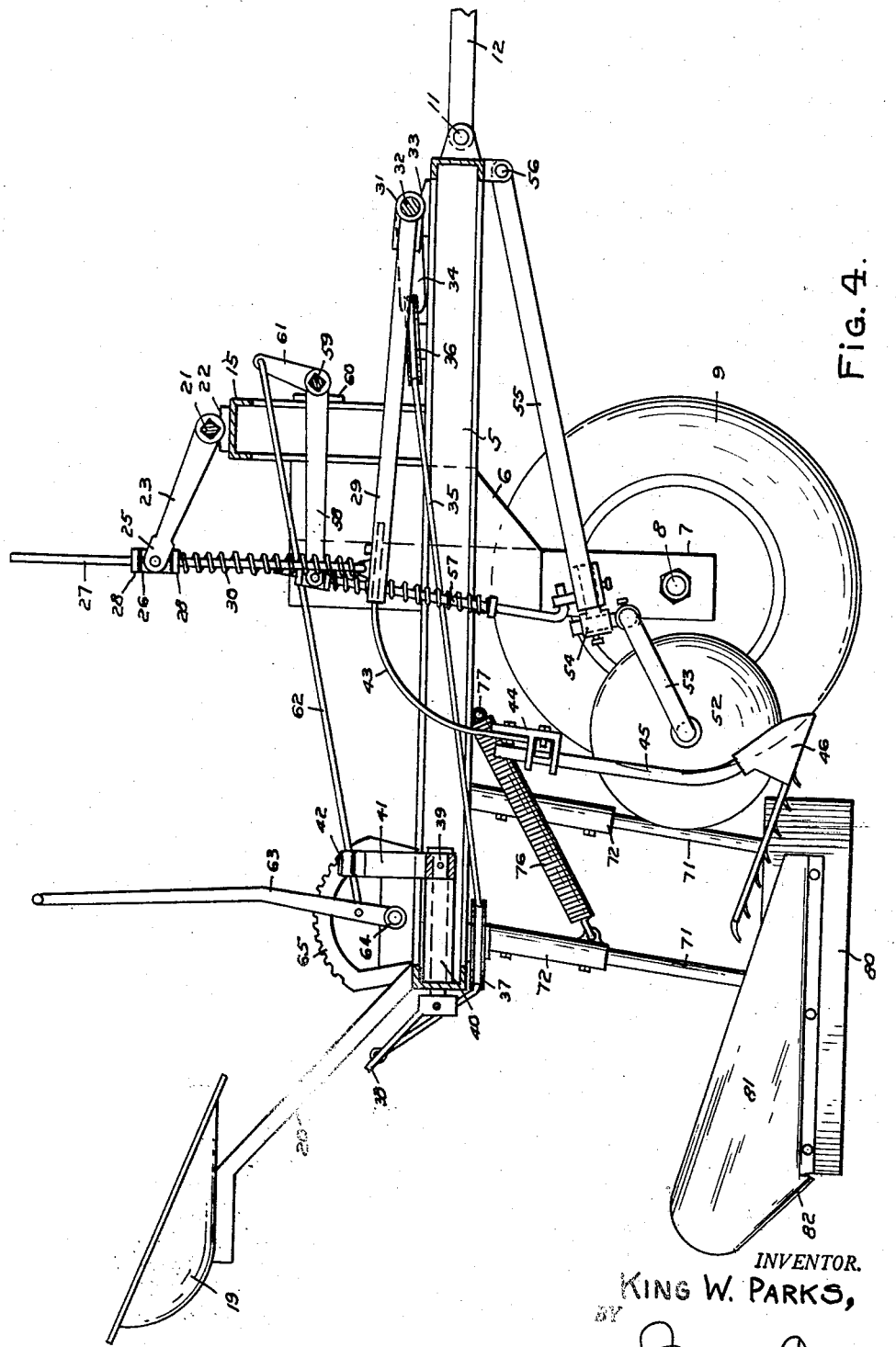

United States Patent Office 2,853,930
Patented Sept. 30, 1958

2,853,930
AGRICULTURAL MACHINE

King W. Parks, Delray Beach, Fla., assignor to Parks-Whipple, Incorporated, Fort Lauderdale, Fla., a corporation of Florida Application September 21, 1954, Serial No. 457,417

4 Claims. (Cl. 97—56)

This invention relates to improvements in agriculture machines of the wheeled type that are constructed in a novel manner to support various earth conditioning tools.

An object of the invention resides in a novel mechanism for the vertical and lateral control of implement bars that are supported upon the machine in a manner to permit their lateral shifting from a common point during the travel of the machine over crop rows, whereby a rider may observe and accurately control the lateral movement of the implement bars to maintain the implements in their correct line of travel, regardless of any uneven travel of the machine.

The invention further contemplates a novel hiller for use in maintaining the sides of crop rows.

The invention further contemplates a novel form of draft tongue that is adjustable to permit the connection and traverse of the device by a power driven machine, such as a tractor.

Novel features of construction and arrangement of parts will be more clearly apparent during the course of the following description, reference being had to the accompanying drawings, wherein has been illustrated a preferred form of the device and wherein like characters of reference are employed to denote like parts throughout the several figures.

In the drawings:

Figure 1 is a plan view of a machine constructed in accordance with the invention, Figure 2 is a side elevation thereof, Figure 3 is a perspective view of a hiller embodied in the invention, and Figure 4 is a substantially longitudinal vertical sectional view taken on line 4—4 of Figure 1.

Referring specifically to the drawings, the numeral 5 designates a generally rectangular or square metallic frame that constitutes the supporting means for the mechanism to be hereinafter described. The frame 5 is preferably formed of channel iron of desirable dimensions. Rigidly fixed upon the sides of the frame 5 are plates 6 that extend above and below the frame. The plate 6 constitutes the mounting means for channel irons 7, the lower ends of which carry stub shafts 8 for the rotatable support of ground wheels 9. The channel irons 7 are adjustable vertically upon the plates 6 as a means for elevating or lowering the frame 5 with respect to the ground wheels. Bolts 10 serve to rigidly clamp the angle irons 7 in their adjusted position. Pivotally supported, as at 11, upon the front of the frame 5 is a generally Y-shaped draft device 12, likewise preferably formed of channel iron. The draft device 12 is swingable in a vertical plane and is adjustably held at a desired angularity by a brace member 13, the upper end of which is pivotally connected, as at 14, to a forward side of a rigid inverted U-shaped frame member 15. The opposite end of the brace 13 is pivotally connected at 16 to a bracket 17 that is adjustable with respect to the draft member 12 and through the medium of which the draft device 12 may be angled with respect to the frame 5. A hitch device 18 is adjustably connected with the forward end of the draft device 12 through the medium of which a suitable connection may be made with the draw bar of a tractor or the like.

The rear end of the frame 5 is provided with a conventional seat 19 that is connected with the frame 5 by a suitable bar 20. The seat 19 may, if desired, be pivotally connected with the bar 20 to permit tilting movement thereof. Extending across the top of the frame 15 and parallel thereto is a rock shaft 21, journalled at its ends in suitable bearings 22. The rock shaft 21 is preferably square or hexagonal for its major length and adjustably supports a plurality of crank arms 23 that are adjustably fixed upon the shaft 21 by set screws 24. The rearward ends of the arms 23 are provided with yolks 25 that have suitable pivotal connection with a sleeve 26 that slidably engages an implement actuating rod 27 in the well known and customary manner. Collars 28 are adjustably positioned upon the rod 27 as a means of varying the operative connection of the yolk 25 with respect to the rod 27 and the upper collar 28 is provided with any desirable means for holding it in adjusted position upon the rod, while the lower collar 28 bears against the spring 30. The rod 27 at its lower end is pivotally connected with an implement bar 29 and a compression spring 30 is compressed between the lower collar 28 and the bar 29.

The several bars 29 at their forward ends are adjustably mounted, as at 31, upon a floating shaft 32. The shaft 32 is disposed adjacent the forward end of the frame 5 and is slidably journalled in bearings 33. The purpose in so mounting the bars 29 upon the shaft 32 is to permit simultaneous lateral shifting of the several ground implements supported from the bars 29 in order that the operator may accurately maintain the several ground implements in their correct line of travel during the traverse of the machine along the crop row regardless of any uneven travel of the ground wheels 9. The means for laterally shifting the shaft 32 and its associated bars 29 comprises a plate 34 that is fixedly connected by set screws or the like to the opposite extended ends of the shaft 32. Each of the plates 34 at their free ends are connected with a flexible cable 35 that is trained over grooved pulleys 36 that are rotatably supported at opposite sides of the frame 5 rearwardly of the shaft 32. Each of the cables 35 extends rearwardly and is trained over grooved pulleys 37 rotatably supported adjacent the rear opposite corners of the frame 5. The cables at their terminal ends are connected to a common operating crank 38 that is rigidly connected to a shaft 39, journalled as at 40 centrally of the frame 5 and extending inwardly of the frame. The inner end of the shaft 39 is provided with a double pedal device 41 through the medium of which the operator, when seated upon the seat 19, may engage the stirrups 42 in a manner that permits of a relatively easy rocking of the shaft 39 in either direction to actuate either of the cables 35 for shifting the shaft 32 in the desired direction.

The bars 29 have connected thereto at their rear ends the usual and well known arcuate flat spring tensioned implement connectors 43. The connectors 43 as is well known are bowed downwardly for detachable connection with implement clamps 44 that receive and clamp the usual cylindrical implement arms 45 that carry at their lower ends the earth working implements, here generally illustrated as a cultivator device 46. The several bars 29, the connectors 43, the clamps 44 and the associated implement arm and implement 45 and 46 may be simultaneously elevated or lowered by rocking the shaft 21. Rocking of the shaft 21 is accomplished through the medium of an upstanding crank arm 47 that is pivotally connected at its upper end with a rod 48 that is rearwardly extended for pivotal connection with an operating lever 49, pivotally connected at 50 upon a suitable toothed quadrant 51 that is rigidly mounted adjacent the rear end of the frame 5 and within convenient reach of the operator from the seat 19. It will thus be apparent that the operator may, with a minimum of effort, control the elevating and lowering of the several ground implements and at the same time be able to shift the several implements laterally to guide them in an accurate line of use.

A cultivator disc 52 is preferably arranged at opposite sides of the machine adjacent the ground wheels 9. The discs 52 are carried upon the conventional cultivator shaft 53 that is universally connected at 54 to an elevating and lowering bar 55 that is pivotally connected at its forward end, as at 56, beneath the forward cross member of the frame 5 adjacent its ends. The bars 55 are elevated and lowered through the medium of a spring tensioned rod 57 that has connection adjacent its upper end with a crank arm 58. The arms 58 are mounted upon a rock shaft 59 journalled at its opposite ends in bearings 60 carried by the forward side of the frame 15. A crank arm 61 disposed adjacent one end of the shaft 59 is actuated through the medium of a rod 62 that is connected at its opposite ends through an actuating lever 63 that is pivotally connected at 64 to a frame member of a toothed quadrant 65. The lever 63 and its suitable latch mechanism (not shown) is of conventional construction and disposed within easy reach of the operator from the seat 19. Thus, through the medium of the lever 63, the discs 52 at opposite sides of the machine may be elevated or lowered in accordance with the depth of cut desirable. Through the medium of the universal connection 54, the discs may be adjusted to any desired horizontal or vertical angle. The shaft 21 is preferably spring loaded in a clockwise direction to facilitate the elevating and lowering of the several bars 29, and for this purpose the shaft 21 at one end is provided with a crank arm 66 that has connection with a tension spring 67, the lower end of which is connected to a suitable anchor plate 68 carried by the frame 5.

It will thus be apparent from the description so far given that the operator may quickly and easily adjust the several implements 46, both vertically and laterally and maintain the implements in a correct line of travel even though the machine is traversing relatively rough ground.

A further feature of novelty included in this invention comprises a pair of hillers that are disposed at opposite sides of the machine for the purpose of smoothing and packing the soil upon the incline sides of a crop row and is particularly adaptable for such work where the discs 52 have traveled in advance and harrowed the soil adjacent the sides of the row. The hillers each embody a flat elongated and vertically disposed runner 69 that is pivotally connected at spaced apart points 70 to a pair of normally parallel rods 71. The rods 71 at their upper ends engage within sleeves 72 that carry at their upper ends bearing sleeves 73 rockably supported upon bolts 74. The bolts 74 extend transversely of a box frame 75 that is detachably bolted to the opposite sides of the frame 5 in a manner to permit the hillers to be disconnected when the machine is to be employed in other capacities. The rearmost sleeve 72 is connected at its lower end with torsion springs 76, the opposite end of the spring being connected, as at 77, to a suitable bracket carried by the forward end of the box frame 75. Thus, the hiller through the medium of the sleeves 72 and the rods 71 is spring loaded in a forward direction and with the spring having adequate tension to maintain the hiller in the operative position under normal use. However, should the hiller engage a relatively immovable object, the spring permits the hiller, the rods 71 and the sleeves 72, to swing rearwardly to over-ride such obstacle. The runner 69 normally travels in a straight line parallel to the crop row. Pivotally connected, as at 78, adjacent the forward end of the runner 69, is a moldboard 79. The moldboard embodies a flat elongated plate 80 and a transversely angled plate 81. The plate 81 is bolted throughout its major length to the plate 80 and is relatively permanent therewith. Plate 81 is angled upwardly and rearwardly with its rear end being rounded, as shown. The lower trailing edge of the plate 81 is angled inwardly, as at 82, to provide a scraping action to more effectively crush and pulverize any relatively large particles of soil that may be agitated by the discs 52. The moldboard, including the plates 80 and 81, are angularly adjustable with respect to the runner 69 through the medium of overlapping and apertured links 83. The links 83 are in turn pivotally connected to the runner 69 and the plate 80 respectively. Thus the horizontal angularity of the moldboard may be quickly and easily adjusted in accordance with the particular crop row to be treated. The moldboard thus travels forwardly with the machine gathering up and packing the soil against the angular sides of the crop row that has been previously harrowed by the discs 52.

In the use of the device, it being first determined the type of implements to be employed, the implements are subsequently attached in the usual manner to the clamps 44, it being understood that during this clamping action the several bars 29 have been elevated by the lever 49. Obviously, the number of implements to be employed will be determined by the particular work to be performed. The several implements will obviously be latched in the upper inactive position until such time as the machine approaches the area to be treated. The discs 52 having been previously adjusted to the desired cutting angle will in turn be elevated through the medium of the lever 63, to be held in such position until the machine approaches the field of operation. While the hillers may be bodily adjusted upwardly with respect to the sleeves 72, it is also possible that they may be elevated out of contact with the ground by changing the angularity of the frame 5. This is accomplished by releasing the bracket 17 and, by lifting upwardly upon the draft device 12, the bracket may then be re-engaged within a selected opening and the draft device will then be held at an acute angle with respect to the frame 5. Thus, when the device is connected with the draw bar of a tractor or the like, the entire frame will be angled so that its forward end will be lowered and its rear end elevated, which action elevates the hillers from engagement with the ground. The hitch 18 may likewise be adjustable to compensate for the angularity of the draft device 12. After the machine has reached the point of operation, the frame 5 is adjusted downwardly through the medium of the draft device 12 and the brace 13 to the point where the hillers are substantially parallel with the ground and in contact therewith. The operator then proceeds to release the lever 49 to permit the implement or implements to be lowered to a predetermined depth for engagement with the surface soil of the crop row. The lever 63 is also released, permitting the discs 62 to shift downwardly to a position where they are substantially in harrowing engagement with the incline sides of the crop row. The machine is then moved forwardly causing the discs 52 to harrow and cut away grass, roots and the like from the sides of the crop row, while at the same time the implement or implements 46 are cultivating or otherwise treating the surface of the crop row. Such dirt as is cut away by the discs 52 is engaged and broken up and scraped upwardly by the moldboard 79, thus creating a well cultivated and symmetrical crop row having its sides at a predetermined angularity. Thus, cultivation is continued from time to time and with a minimum of effort maintains the crow row free from grass and weeds. Should the wheels 9 engage obstructions or depressions within the valleys between adjacent crop rows, it will be clearly apparent that the machine will be rocked back and forth creating uneven cultivation. For this purpose, the operator riding with his feet upon the stirrups 42 may easily actuate the floating shaft 32 in either direction to maintain the implements in an accurate line of travel. This lateral adjustment of the implements is particularly desirable during the cultivation of row crops where it is desirable to employ cultivators upon each side of a row crop that will extend beneath the foliage of the plants. The operator can thus control the line of travel of the cultivators so as not to be shifted into engagement with the stalks of the plants as the machine moves forward. Such a cultivator has been disclosed in a copending application, filed August 20, 1954, and bearing Serial No. 451,084, now Patent 2,726,592. The machine is capable of performing in multiple ways for maintaining crop rows in condition both from the standpoint of cultivation and maintaining the sides and adjacent areas of the row free of weeds or the like at a minimum cost in time and labor.

It will be apparent from the foregoing that a very novel form of machine has been provided for maintenance and cultivation of crop rows of the elevated type or just as readily adapts itself to the cultivation of level ground by the removal of the hillers. The parts are relatively few and simple, are easily adjusted, are strong, durable, cheap to manufacture and highly effective for the purposes stated.

It is to be understood that the invention is not limited to the precise structural details shown, but that changes are contemplated as readily fall within the spirit of the invention as determined by the scope of the subjoined claims.

Having described my invention, what I claim as new and desire to secure by Letters Patent is:

1. An earth conditioning and crop cultivating machine for use in straddled relation to elevate crop rows having incline sides, a wheeled frame having a draft device for conducting the machine along the crow row, a shaft supported upon the frame at its forward end and with the shaft being journaled in bearings at opposite sides of the frame in a manner to permit of a sliding movement of the shaft transversely of the frame, an operator's seat carried at the rear end of the frame, means operable under the influence of the feet of an operator supported upon said seat whereby the shaft may be shifted back and forth during the travel of the machine, a plurality of substantially parallel implement carrying bars adjustably connected upon the shaft in spaced apart relation to each other and whereby to permit the implement bars to rise and fall in a vertical plane, a rock shaft carried by the frame and with the rock shaft being provided with a plurality of crank arms that have yieldable connection with the rear extremities of the implement bars, the crank arms and the yieldable connections being equal in number to the implement bars, means disposed adjacent the operator's seat for manually rocking the rock shaft to elevate or lower the implement bars, implement connecting means carried by the rear extremities of the several bars for detachably supporting earthworking implements, a vertical adjustable disc harrow disposed at opposite sides of the frame adjacent to the wheels and whereby to harrow the earth adjacent to the sides of the crop row.

2. The structure according to claim 1 wherein the said shaft has its opposite ends extending outwardly beyond the said journal bearings, a cable connected with the opposite extended ends of the shaft and with the cables being trained to a point adjacent the operator's seat, the rear end of the cables being connected to a common crank that is operable by the feet of an operator seated upon the seat and antifriction guide means for the cables.

3. The structure according to claim 1 wherein the frame is provided with a journal bearing at a point intermediate a rear cross member of the frame and with the last named journal being horizontally arranged and longitudinal with respect to the frame, the said journal extending forwardly of the operator's seat, a shaft journaled in the last named bearing to project beyond each end thereof, the shaft at its rear end being provided with a crank arm, the shaft at its forward end being provided with a pedal having a pair of oppositely extending stirrups for the reception of the operator's feet, cables connected with the last named crank and with the cables being trained forwardly of the frame for connection with the opposite ends of the first named shaft, the said crank arm when shifted under the influence of the pedal serving to actuate the cables in opposite directions whereby to move the first named shaft transversely of the frame and for simultaneously shifting the several implement bars and their supported implements transversely with respect to the frame and transversely with respect to the line of travel of the device.

4. An agricultural machine of the character described that comprises an open rigid frame having supporting ground wheels, a draft device connected with the forward end of the frame, the frame being generally square in top plan, an operator's seat disposed upon a cross member at the rear of the frame substantially centrally thereof, a journal bearing being disposed horizontally and substantially upon the longitudinal center line of the frame, a shaft journaled in the bearing and with the shaft provided at its forward end with a pedal having a pair of stirrups whereby the shaft may be rocked under the influence of the feet of an operator seated within the seat, the shaft at its rear end being provided with a crank arm, a shaft extending transversely of the frame adjacent its forward end, journal bearings carried by the frame at its opposite side for the support of the last named shaft and with the shaft being slidably engaged in the bearings, the opposite ends of the last named shaft extending beyond each bearing, a flexible cable connected with the opposite ends of the last named shaft, the said cables being trained rearwardly and having their rear extremities connected to the said crank, grooved pulleys engaged by the cables and whereby to antifrictionally support the cables, the said cables being shiftable under the influence of a rocking motion imparted to the first named shaft under the influence of the pedal and whereby the second named shaft is shifted back and forth in its journal bearings, a plurality of spaced apart implement bars adjustably supported upon the second named shaft and with the bars being swingable in a vertical plane upon the second named shaft, means carried by the rear ends of the implement bars for supporting earthworking implements, an intermediate upstanding frame that extends transversely of the first named frame, a rock shaft journaled in bearings carried by the last named frame, a plurality of crank arms adjustably connected with the rock shaft and with the crank arms corresponding in number to the implement bars, yieldable means connecting the crank arms with the rear ends of the implement bars and whereby to bias the implement bars downwardly, means for rocking the rock shaft and with the said means extended to a point adjacent the operator's seat, the said rock shaft being biased in a direction to normally urge the crank arms and the implement bars upwardly.

References Cited in the file of this patent

UNITED STATES PATENTS

| | | |
|---|---|---|
| 1,286,557 | Dickinson | Dec. 3, 1918 |
| 1,339,040 | Parrish | May 4, 1920 |
| 1,576,029 | Braley | Mar. 9, 1926 |
| 1,648,639 | Court et al. | Nov. 8, 1927 |
| 1,823,548 | Kaupke | Sept. 15, 1931 |
| 2,019,238 | Shiki | Oct. 29, 1935 |
| 2,598,219 | Burgess | May 27, 1952 |